United States Patent [19]

Carney

[11] Patent Number: 5,127,616
[45] Date of Patent: Jul. 7, 1992

[54] POT LID AND UTENSIL HOLDER

[76] Inventor: Jack J. Carney, Unit 4 - 17 Lawrence Dr., Nerang, Queensland 4211, Australia

[21] Appl. No.: 584,097

[22] Filed: Sep. 18, 1990

[51] Int. Cl.⁵ .............................. A47G 23/00
[52] U.S. Cl. .................. 248/176; 248/37.3; 211/41
[58] Field of Search .............. 248/176, 121, 37.3, 248/174, 175, 447, 454, 461, 465, 312, 688, 37.6, 105, 106; 211/70.7, 41

[56] References Cited

U.S. PATENT DOCUMENTS

| 746,878 | 12/1903 | Reichelt | 248/175 |
|---|---|---|---|
| 807,840 | 12/1905 | Martin et al. | 248/37.6 |
| 1,065,000 | 6/1913 | Sarter et al. | 211/41 |
| 1,298,212 | 3/1919 | Holdsworth | 248/213.2 X |
| 1,886,075 | 11/1932 | Zorsch | 211/70.7 |
| 1,928,995 | 10/1933 | de Biasi | 248/37.6 X |
| 2,594,473 | 4/1952 | McCoy | 248/37.3 |
| 2,664,005 | 12/1953 | Kosinski | 248/37.3 X |
| 2,746,702 | 5/1956 | Gourley et al. | 248/176 X |
| 2,934,210 | 4/1960 | Jordan | 211/41 |
| 3,028,972 | 4/1962 | Guillaumant | 211/41 |
| 3,954,247 | 5/1976 | Krusche | 248/121 X |
| 4,333,623 | 6/1982 | May | 248/176 |
| 4,790,503 | 12/1988 | Pohler | 248/37.3 X |
| 4,834,328 | 5/1989 | Hall | 248/174 X |
| 4,850,556 | 7/1989 | Otani et al. | 248/206.2 |
| 4,998,627 | 3/1991 | Elder | 211/41 X |

FOREIGN PATENT DOCUMENTS 383138 11/1932 United Kingdom .............. 248/37.6

Primary Examiner—Karen J. Chotkowski
Attorney, Agent, or Firm—G. Donald Weber, Jr.

[57] ABSTRACT

A device for holding pot lids and/or cooking utensils. The device includes a first generally planar component with separate notches, apertures, ledges or the like for supporting pot lids or cooking utensils. A second generally planar component is mounted to said first planar component to support said first planar component and to selectively receive cooking utensils supported by said first planar component, as well as retain any drippings from the utensils.

13 Claims, 2 Drawing Sheets

POT LID AND UTENSIL HOLDER

BACKGROUND

1. Field of the Invention

This invention concerns a device for holding various cooking utensils in such a manner as to facilitate the cooking of food.

2. Prior Art

Until the development of the present invention there has not been a device available for holding pot or pan lids in a convenient manner when they are taken off a pot (or pan) in the middle of cooking in order to stir the contents of the pot, add liquids thereto, or some similar action.

Cooks everywhere have experienced the difficulties involved in handling a hot and dripping pot lid. Where to put such a lid has always been a problem. The choice was to put the lid down on a surface while holding onto the pot lid knob, which is easy enough, but leaves a pool of water from condensing steam. Alternatively, one could awkwardly attempt to turn the lid upside down and try to set it upon its knob thereby eliminating the pool of water but often burning one's fingers instead.

The present invention is designed to conveniently receive and hold a hot lid in such a way as to avoid the dripping of water or other hazards. The invention also makes it easy to put on or take off almost any size or shape lid which includes a knob handle.

Further, the present invention can be configured in its basic working shape so as to conveniently hold stirring spoons and the like, as well as pot lids. Also, provision can be made to hold condiment or herb containers or shakers, if desired.

The present invention resides, in a preferred aspect, as one or more pieces of essentially planar plastic or metal each of which is bent and notched in a specific manner so as to facilitate the placing on and taking off of pot lids, as well as receiving stirring spoons or other such like utensils.

PRIOR ART STATEMENT

A list of patents discovered during a search is provided herewith. The patents are listed in numerical order with no emphasis or special ranking thereof.

U.S. Pat. No. 3,878,584; G. E. B. Dingerkus. The securing device for a handle inserted on a carrier bar affixed to an article wall has a leaf spring disposed in an insert opening of the handle. The spring includes, at the one end, a first engaging portion forming a barb that contacts the carrier bar and and, at the other end, a second engaging portion constituting an elbow, the peak of which contacts the carrier bar. The elbow has an external free leg which extends from the insert opening towards the article wall. The spring is releasable held in the insert opening by an externally accessible attaching device.

U.S. Pat. No. 3,964,602. The device is made from a hygenic, easily cleaned, washable and rotproof material such as plastic. The general shape is rectangular with radiused edges and profiled sides. The back is flat, for fixing. The front face has two side-by-side recesses in its surface, of a truncated ovoid shape, and wider than deep. The base extends forward to form a ledge and is provided with a lip along the front. The spoon bowl fits in the recess, butting against the lip. The handle rests in a cutout along the top edge, central above each recess.

U.S. Pat. No. 3,979,145. The hot pan handling device comprises a bottom of sheet-like material with opposite side walls and single front end wall of sheet-like material integrally connected thereto and extending upwardly therefrom with an open back. A side handle is connected to each of the opposite side walls and extends upwardly therefrom. A front end handle is connected to the front end wall and extends outwardly therefrom. The hot pan is manipulated onto the bottom wall of the handling device by way of the open back and transported by lifting the side handles.

U.S. Pat. No. 3,999,794; H. J. Bingaman. A continuous strip of resilient material is welded to provide a small loop at one end, and a large loop at the other end adjoined by rails which are crossed over and pivoted. The rails are flattened in the pivot area and pinned so as to be movable. The loops extend in opposite directions at right angles to the rails.

One loop fits easily over the neck of a large mouth canning jar. The other loop fits easily over a regular sized canning jar neck. Squeezing the rail ends of one loop causes the other loop to tighten around the jar neck on which it is being used and holds the jar firmly for lifting. Relaxing pressure on the rails allows the resilience of the material, reinforced by the spring tension in the loops, to self-adjust the loop back to the original open position.

U.S. Pat. No. 4,094,416; J. A. Smith. The panel body portion can be attached to a wall or to the inside of a kitchen cabinet door. The panel body portion includes marginal flanges which cause the panel body portion to stand off from the supporting door or wall to form a rear compartment for loose paper bags.

Two way adjustable holders for dispensing packages of various sizes and types, for example, foil, plastic wrap, wax paper, are mounted on the panel body portion at different elevations.

U.S. Pat. No. 4,165,115; R. Olsson. A holder for gripping a container, such as a jar, having an outside thread, for picking up hot containers. Two diverging strips are fixed into a handle. At the end of each strip, on the underneath edge, is a right-angled groove, the inner side edge of which is serrated and an additional groove, also right-angled, with a serrated bottom. The serrated notches are designed to grip the top rim and thread of the jar being heated in a pan.

U.S. Pat. No. 4,171,144; R. Rodriguez. A device for lifting and manipulating aluminum foil containers for food products, is constructed with a tubular, insulating handle, and a pair of cranked tines projecting from the forward end thereof. The separation between the tines is adjustable by means of radial slots machined around the periphery of a bezel in the forward end of the handle. One, or both, of the cranked tines is radially displaceable in the handle.

U.S. Pat. No. 4,269,317; D. and M. Rubenstein. A support frame for supporting long rectangular articles such as the cardboard containers holding rolls of metal foil or cellulose sheet. The frame can be a plastic molding in the form of an open rectangle reinforced by vertical and horizontal central cross members. On the inner edges of the outer verticals is a set of horizontal slots. Into these slots fit rectangular shaped hooks, so that a carton can be supported horizontally across two hooks at any selected height. The rectangular shape of the hooks enables the sheet material to be dispensed conveniently from the carton.

U.S. Pat. No. 4,294,421; E. Kuenstlic et al. A knife holder has a base which supports several roller grips placed side-by-side. The rollers are mounted on a journal located on the base and have facing circumferential surfaces to provide a nip. A knife blade can be clipped in or out from the rollers, which turn to assist the movement.

A protective outer casing removably mounted on the base has recesses to aid insertion or removal of the knives. The journals have a spacing which is less than the diameter of the rollers, so that the rollers are resiliently pressed together.

U.S. Pat. No. 4,299,366; K. A. Kurzius. A holder for holding a can which has a top and bottom ridge. It has a round base of diameter approximately as large as the diameter of the can to be supported. A springable handle is carried on the base support and is formed of a single rectangular piece of plastic material. A first transverse U-shaped band in the distal end of the handle engages the top ridge of the can. A second transverse U-shaped band in the handle adjacent the base engages the bottom ridge of the can whereby the can is received in the holder between the first and second transverse bends.

U.S. Pat. No. 4,388,743; D. L. Hellinger et al. A low thermal conductivity removable heat insulating cover for a cooking utensil lid handle has a hand grip for surrounding the lid handle at least along a central portion, with a pair of closely adjacent portions depending from the hand grip toward the lid surface. It has a protective portion to lie closely adjacent the lid surface, covering a region of that surface to form a barrier for preventing a user's hand from contacting the lid. The protective portion comprises two lateral extensions of the ends of the closely adjacent portions remote from the hand grip, with the cover being formed as a section of an extrusion of uniform cross-sectional configuration. The closely adjacent portions may be releasably joined together by a rib and groove connection along the adjoining surfaces.

U.S. Pat. No. 4,471,985; P. E. Mahoney. A barbecue grill lifting tool has a cylindrical rear handle and a front grill engaging element connected by an elongated rigid stem which disposes the element below and in front of the handle. The grill engaging element has substantial width, with side edges symmetrical to a plane containing the axes of the handle and stem. It defines top and bottom surfaces normal to the plane and approximately parallel to the handle axis.

The bottom surface includes a transverse groove, spaced back from the front edge of the grill engaging element. One rod of a grill is received for stabilization of the grill, while an adjacent rod is supportingly engaged by the surface. The front of the element is configured for use as a grill rod scraper.

U.S. Pat. No. 4,482,181; C. B. Shepherd. A lifting device for a grill or barbecue, comprises an insulated handle, a pair of fixed legs and a reaction element hooking under bars of a grill.

U.S. Pat. No. 4,487,117. An enclosed frying pan has a metal cover with a plastic outer cover having two opposing projections forming a hand grip and a hinge in which a condensate collector is incorporated. The outer cover, which can be clipped into place on the fryer and disengaged completely by pressure on the cranked hinge, has one opening for a filter cartridge and a second aligned to a similar opening in the metal cover. The two covers interlock to imprison a transparent shell of polyamide forming a double window which does not coat over during use. The frying basket is linked to a handle hanging vertically which, when lifted into the horizontal, raises the basket from the pan. The two can be locked by a simple movement for manipulating the basket away from the fryer.

U.S. Pat. No. 4,511,167; T. Kawaguchi. The detachable holder is composed of a first pair of bent arms having respective ends connected to each other via a hinge. Two handle-levers connect free ends of the first pair of arms with those of the second pair of arms. A fixing member is engageable with the handle-levers for clamping the container by the holder. Detachment of the holder from the container is achieved by sliding the fixing member on the handle-levers.

U.S Pat. No. 4,561,548; D. D. Call. A knife holder comprises a housing having vertical slit sockets to take the blades of the knives. The slits open into the upper face which supports the knife handles and are open over a part of their length towards the front of the knife holder. The knives can be moved in and out without having to be raised up over the entire length of their blades and are held in place by a knife lock.

U.S. Pat. No. 4,632,248; J. Borner. A receptacle for a kitchen utensil has a rectangular base element having an open frame for receiving the kitchen utensil. It comprises at least one detent movable transversely with respect to the insert direction provided in one wall of the frame. After insertion of the kitchen utensil into the frame, the detent engages behind the utensil on a catch.

U.S. Pat. 4,673,089; J. P. Chap. The cup holder is fixed to a panel, and consists of a wire clip with a U-shaped flexible piece resting on the sides of the panel. The wire clip has two U-sides spaced apart from one another. Two guide pieces extend from the U-sides of the clip which is stuck to the panel by means of adhesive.

U.S. Pat. No. 4,715,633; D. F. Brink, et al.. A coiled member has two overlapping ends defining a central opening for receiving a cup. The extent of overlap is variable for adjustment of the size of the central opening for receiving and gripping various sized cups. The coiled member also has an elongated slot in the inner end portion and an opening in the outer end portion aligned with the slot in the inner end. A handle is provided to hold the coiled member. A combination connector and attachment is positioned in the slot and in the opening for maintaining the inner and outer end portions in abutting, interconnected relationship while permitting relative sliding movement between throughout the length of the slot to enable expansion and contraction of the coiled member and attachment of the handle thereto.

U.S. Pat. No. 4,884,714; J. B. Bechtel. A utility rack can be releasably affixed through suction cups or magnets alongside a sink to guide run-off water or the like through an appropriately-sized and shaped lip-extension, into the sink. Various attachments to the rack can provide dish holding means, or a cutting surface.

SUMMARY OF THE INVENTION

The present invention comprises a cooking utensil apparatus in the nature of a potlid holder. The apparatus consists primarily of a base leg and an upright leg. A shallow depression or receptable may be molded or formed in the base leg. This receptacle or depression can be used to retain dripping matter from stirring spoons, pot lids or the like. The upright leg is attached to or integral with the base leg. Typically, the upright leg, in relation to the base leg, forms an internal angle of less than 90 degrees. The upright leg which is fabricated at an acute angle relative to vertical, is formed with a large, possibly rounded, V-notch at its upper end. The notch is designed to receive almost any size knob which is attached to a lid. The upright leg may contain one or more smaller notches located near the junction with the base leg which notches are designed to receive the handles of spoons or the like. Alternatively, a large hole of a generally half-circle shape may be formed in the middle of the upright leg so that a spoon can be passed therethrough to rest upon the base leg receptacle. Moreover, the upright leg may be formed of a frame, for example of wire or the like. Further, if desired, the base leg or the upright leg can be formed to serve as receptacles for containers such as salt and pepper shakers. Moreover, the base leg may be adapted as a handle for manipulating the pot lid or the like.

BRIEF DESCRIPTION OF THE DRAWINGS

In order that the invention may be more readily understood and put into practical effect, reference will now be made to the accompanying drawings which illustrate preferred embodiments of the invention and wherein.

DESCRIPTION OF THE PREFERRED EMBODIMENT

Figure 1:
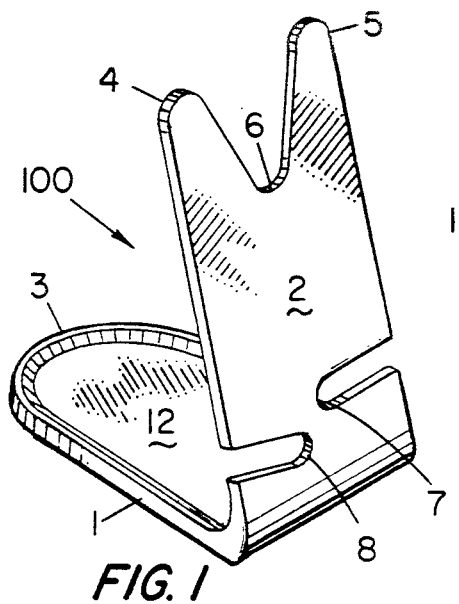
FIG. 1 is a perspective view of one embodiment of the device of the instant invention.

Referring now to FIG. 1, there is shown a perspective view of one embodiment of the instant invention. Illustrated is the base leg 1 which is generally planar in configuration. In this embodiment, base leg 1 includes a slight depression 12 in the upper surface thereof. Also in this embodiment, base leg 1 includes rounded end 3. Of course, the base leg 1 can have any desirable shape.

Also shown is the upright leg 2 which is generally planar in configuration. Upright leg 2 forms an internal angle with base leg 1 of less than 90 degrees. Also shown at the top, free end of upright leg 2 are the rounded tangs 4 and 5 which guide the pot lid knob into the generally V-shaped notch 6 defined between the tangs. Also shown in this embodiment are the notches 7 and 8 in the sides of the upright leg 2. The side notches 7 and 8 are adapted to receive the handles of spoons, forks or other utensils, and allow the bowls of the spoons (or the like) to rest in the depression 12 formed in the base leg 1. In this embodiment, the base leg 1 and the upright leg 2 are joined together at a common joint. This joinder can be effected as an integral feature or it can be in the form of a hinge or any other suitable joinder.

Figure 2:
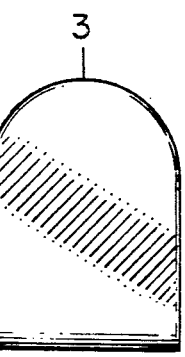
FIG. 2 is a bottom plan view of the base leg of the invention.

FIG. 2 shows a plan view of the base 1 as viewed from the underside of the device shown in FIG. 1. Also shown is the rounded end of the base leg 3 in the preferred embodiment. The base leg 3 need not be rounded, per se, and may take any configuration desired. While not shown in this Figure, base leg 1 may include suitable "feet" in the form of dimples, insulation, or the like.

Figure 3:
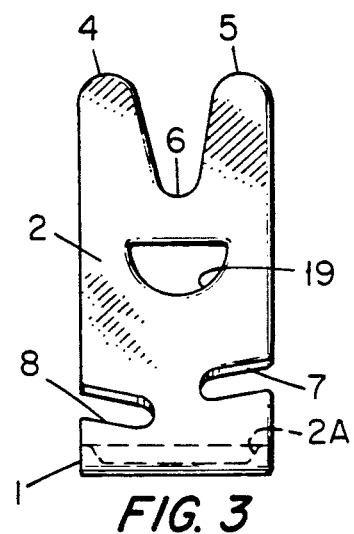
FIG. 3 is a front plan view of the upright leg of the invention.
Figure 5:
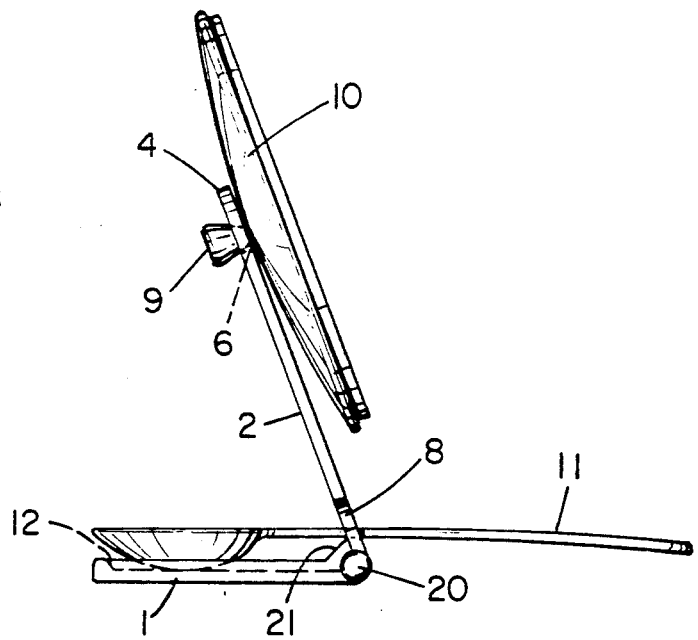
FIG. 5 is a side view of the invention as seen in FIG. 1 showing a pot lid and stirring spoon positioned and held in a convenient manner.

FIG. 3 shows the upright leg 2 as seen from the front of the device as shown in FIG. 1. In this embodiment, one interlocking arrangement of the legs 1 and 2 is shown in dashed outline. Thus, tongue 2A of leg 2 is inserted into a suitable slot in leg 1. This joinder is fairly snug so as to retain the legs in the desired position during use. However, legs 1 and 2 can be separated for storage, if so desired. Also shown are the two rounded tangs 4 and 5 which form the generally V-notch 6 which receives the pot lid knob to hold it in the proper position for retrieval. The two side notches 7 and 8 which allow the handles of spoons and the like to be rested therein are clearly depicted. The bowls of spoons, tines of forks, or the like are arranged to rest within the slight depression or in the base leg 1 as seen in FIGS. 1 and 5. An aperture 19 can be formed at or near the center of upright leg 2 in order to receive and support a spoon or the like.

Figure 4:
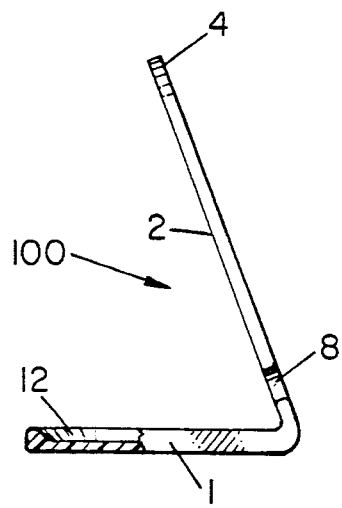
FIG. 4 is a side view of the present invention showing a one piece construction and the basic form of two legs.

Referring now to FIG. 4, there is shown a side view of the device. It is seen that an interior angle of less than 90 degrees is formed between the base leg 1 and the upright leg 2. Also shown is the side notch 8 for receiving and holding a utensil handle. Upper tang 4, one of a pair that forms the deep notch 6 which holds the knobs of the various sized pot lids (see FIG. 5) is shown. The legs 1 and 2 can be integrally formed as shown. Conversely, the legs 1 and 2 can be interlockingly joined together with a dovetail-type joint (see FIG. 3), a hinged connection (see FIG. 5), or the like.

FIG. 5 is a partially broken away side view of the invention with a pot lid 10 held thereon by knob 9. In particular, the knob 9 is retained within the notch 6 of upright leg 2. The knob 9 is guided into the notch 6 by the pair of tangs 4 and 4 of which only tang 5 is shown at the end of the upright leg 2.

Also shown at the lower end of the upright leg 2 is a side notch 8 which holds and receives the handle of the spoon 11. The bowl of the spoon 11 rests in the shallow depression 12 formed in the base leg 1. In this embodiment, the legs 1 and 2 are joined together by hinge 20 of suitable construction. The hinge is mounted to the ends of legs 1 and 2 by any suitable means, including being imbedded in the legs during fabrication thereof. With the hinge 20, the legs 1 and 2 can be folded flat for storage. An abutment 21 or stop can be formed at the end of leg 1 and/or leg 2 in order to maintain the legs in the position shown. Of course, other stops or abutments can be devised and utilized.

Figure 6:
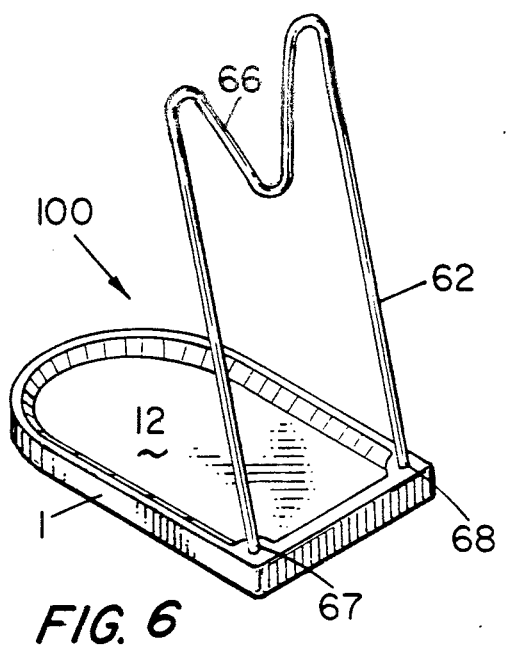
FIG. 6 is another embodiment of the instant invention showing a frame-like construction.

The preferred embodiments shown in FIGS. 1 through 5 contemplate the use of generally planar legs 1 and 2 formed of sheet plastic, wood, lucite or other similar material. However, as shown in FIG. 6, at least the upright leg 62 can be formed as a frame. That is, the leg 62 can be in the form of a bent or contoured wire which has the same general shape as leg 2 in the other embodiments.

The leg 62 shown in FIG. 6 can also take the form of a relatively thin open-frame of plastic or the like.

In the embodiment shown in FIG. 6, the leg 62 includes an upper notch 66 formed therein. Side notches are not shown in FIG. 6 but can be contoured into the leg 62 if so desired.

The leg 6 is arranged to have the ends 67 and 68 thereof insertable into appropriate holes or sockets formed in the end of base leg 1. The leg 62 is arranged to incline relative to leg 1 to form an internal acute angle between at least the upper portion of leg 62 and base leg 1.

Figure 7:
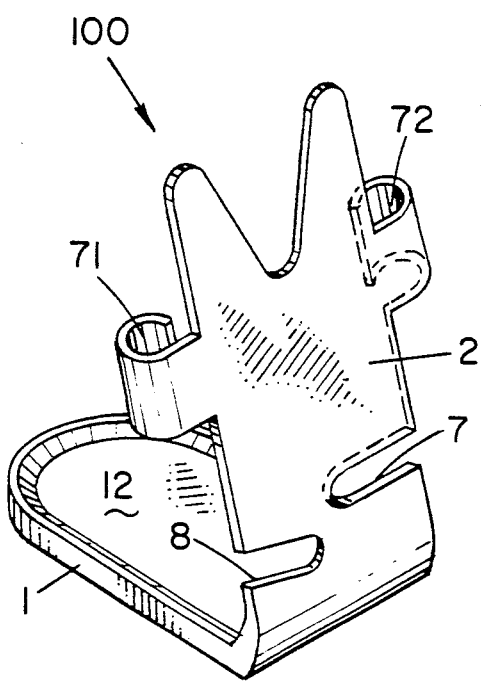
FIG. 7 is another embodiment of the instant invention showing additional retaining elements.

As shown in FIG. 7, further features can be added to the preferred embodiment in order to facilitate other aspects of cooking. In particular, receptacles 71 and 72 can be molded (or otherwise formed) into the base leg 1 or the upright leg 2 (as shown in FIG. 7) of holder 100 to hold utensils or containers such as salt and pepper shakers thereby making them conveniently available while cooking and using the device to hold a pot lid and stirring spoons.

Figure 8:
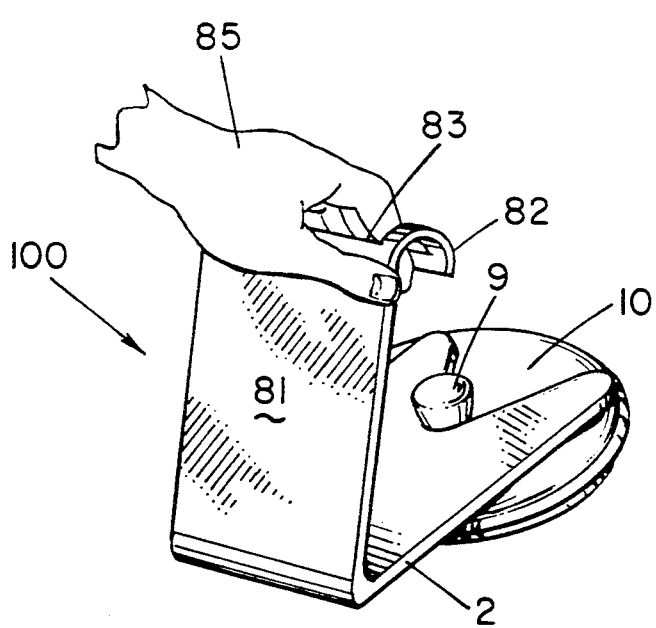
FIG. 8 is another embodiment of the instant invention showing a unique configuration adaptation.

As shown in FIG. 8, the base leg 81 can include an enlarged end 82 which extends upwardly from the upper surface of base leg 81. The end 82 may be in the form of a curled, rolled, straight or other convenient shape. An aperture 83 passes through the enlarged end 82. The aperture 83 is defined to be of appropriate size and dimensions to receive a typical adult-size hand 85. In this embodiment, a disabled or handicapped individual (for example an arthritis sufferer) can grasp end 82 by passing a hand through aperture 83 or around the end 82. The pot lid holder 100 can then be used to handle or grasp knob 9 of the pot lid 10, as well as to hold the lid after it has been removed from a pot.

Thus, there is shown and described a unique design and concept of a pot lid and utensil holder. A particular configuration is shown and described herein. The device in fact may be different in shape and yet retain the essential design characteristics which offer the advantages and conveniences shown and described. While this description is directed to a particular embodiment, it is understood that those skilled in the art may conceive modifications and/or variations to the specific embodiments shown and described herein. For example, either or both of the legs can be formed as a planar-type frame rather than a uniform surface. Moreover, both legs can be identically configured so that the apparatus can be used with either leg in either position. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A pot lid and cooking utensil supporting device comprising,
   a base leg comprising a first generally planar, relatively rigid, self supporting component adapted to rest on a supporting surface, and
   an upright leg comprising a second generally planar, relatively rigid, self supporting component having a long axis and a short axis,
   said upright leg having one end thereof on said short axis mounted to said base leg at an interior angle of slightly less than 90°,
   said upright leg including at least one notch formed in the opposite end thereof on said short axis for receiving a knob on a pot lid to be supported by said device,
   said upright leg includes at least one aperture therein intermediate the ends thereof for receiving a portion of a cooking utensil.

2. The device recited in claim 1 wherein,
   said aperture in said upright leg is disposed intermediate the ends and adjacent to an edge of said second generally planar component.

3. The device recited in claim 1 wherein,
   said first and second generally planar components are rigidly joined together.

4. The device recited in claim 1 wherein,
   said first generally planar component includes a relatively shallow recess therein for selectively receiving at least a portion of a cooking utensil.

5. The device recited in claim 1 wherein,
   said first and second generally planar components are formed of a relatively solid sheet of material.

6. The device recited in claim 1 wherein,
   said first and second generally planar components are integrally formed.

7. The device recited in claim 1 wherein,
   said notch is substantially V-shaped.

8. The device recited in claim 1 wherein,
   said first and second generally planar components are adapted to fit into the other to provide a secure joinder thereof.

9. The device recited in claim 1 including,
   hinge means joined to each of said first and second generally planar components whereby said first and second generally planar components can move relative to each other.

10. The device recited in claim 1 wherein,
    said second aperture is substantially centrally located in said second generally planar component.

11. The device recited in claim 1 including,
    at least one receptacle formed in at least one of said first and second generally planar components.

12. The device recited in claim 1 wherein,
    said first generally planar component includes an enlarged free end to be used as a gripping portion.

13. A pot lid and utensil supporting device comprising,
    a first generally planar sheet component, and
    a second generally planar sheet component having one end thereof mounted to said first generally planar sheet component at an interior angle which is less than 90°,
    said second generally planar sheet component including at least one notch formed in the opposite end thereof for receiving a knob of a pot lid to be supported by said device,
    said first generally planar sheet component forming a stable base for said device,
    said second generally planar sheet component includes at least one opening intermediate the ends thereof and adjacent to an edge thereof for supporting the handle portion of a cooking utensil,
    said first generally planar sheet component includes a relatively shallow recess therein for selectively receiving at least the operative portion of a cooking utensil.

* * * * *